Jan. 20, 1959 — E. R. SCHOENGRUN — 2,869,563
QUASI-ELASTIC MAGNETIC DEVICE
Filed Dec. 12, 1952 — 3 Sheets-Sheet 1

Inventor:
Emile Robert Schoengrun
By Brown & Seward
Attorneys

Jan. 20, 1959  E. R. SCHOENGRUN  2,869,563
QUASI-ELASTIC MAGNETIC DEVICE

Filed Dec. 12, 1952  3 Sheets-Sheet 2

Inventor:
Emile Robert Schoengrun
By Brown & Seward
Attorneys

Jan. 20, 1959 E. R. SCHOENGRUN 2,869,563
QUASI-ELASTIC MAGNETIC DEVICE
Filed Dec. 12, 1952 3 Sheets-Sheet 3

Inventor:
Emile Robert Schoengrun
By Brown & Seward
Attorneys

United States Patent Office 2,869,563
Patented Jan. 20, 1959

2,869,563

QUASI-ELASTIC MAGNETIC DEVICE

Emile Robert Schoengrun, Paris, France

Application December 12, 1952, Serial No. 325,509

Claims priority, application France July 18, 1952

6 Claims. (Cl. 137—43)

This invention relates to magnetic devices intended to replace spring devices as generally used for elastically biasing a movable part of a mechanism of any kind towards a position it is required to occupy and from which it is liable to be displaced by some external force, the function of the magnetic device being to exert a quasi-elastic resistance to displacements of the said part.

It is the broad object of the invention to provide a quasi-elastic springless device for exerting a restoring force on the movable part of any mechanism in which said part is required to occupy a position from which it is liable to be displaced by external force, said restoring force being exerted with a very high accuracy and without liability to variation of the operative effort either with time or as a result of variation of temperature, in whatever medium the device is required to operate.

Although the use of springs for exerting an elastic restoring force has been found very effective in a great number of mechanisms, experience has shown that in a certain number of cases a spring cannot ensure the required restoration with sufficient accuracy, and further, in certain other applications a spring cannot resist the action of media in which it is required to work, and this raises the problem of providing a springless elastic restoring system. For instance, in the case of valves controlling the flow of chemical substances liable to attack the metal of which springs are made, springs can only retain their mechanical properties for a limited time.

In accordance with the invention the use of springs in certain mechanisms is dispensed with and there is employed a magnetic device comprising a fixed magnetic system and a magnetic system unitary with the member of the mechanism which is displaceable in a limited determinate path, each of said two magnetic systems being constituted by one or more magnets so disposed and orientated that one pole of one of the magnetic systems lies between the two poles of the other magnetic system for all positions of said displaceable member within the limits of its path.

Preferably the magnetic system unitary with said movable part of a mechanism is constituted by a permanent bar magnet whose magnetic axis coincides with the longitudinal axis of the path of said movable part and the fixed magnetic field is produced by permanent bar magnets so disposed that one of the poles of the displaceable permanent bar magnet is always situated between the two poles of the fixed magnet system and cannot leave its magnetic field during the displacements of said movable part.

This novel magnetic device is particularly suitable for use in mechanisms in which said movable part is required to be bodily displaced in a rectilinear path coinciding with its longitudinal axis, the limits of said path being so defined that the pole of the magnetic system unitary with said movable part can only be displaced through a predetermined distance extending symmetrically on either side of the median plane of the fixed magnet system whereby, when said pole is displaced under the action of external force beyond the median plane above mentioned, it is simultaneously subjected to the repulsion of the poles of the fixed magnet system having the same polarity, towards which it has been moved, and to the attraction of the poles of the fixed magnet system of opposite polarity, away from which it has been moved. In this way a maximum restoring force is obtained and loss of magnetism of the permanent magnets is avoided or minimised, since the pole of the displaceable magnet located between the poles of the fixed magnet system is always within the magnetic field of the latter.

Although the invention is herein described and illustrated as applied to the movable parts of mechanisms such as closure devices, safety valves, or detents, it will be apparent that it may be embodied also in other mechanisms or devices of the character referred to. It is to be understood, moreover, that the form, construction and arrangement of the several parts herein described and illustrated may be varied within the limits of the claims hereto appended, without departing from the scope of the invention as expressed therein.

Some preferred embodiments of the present invention will be hereinafter described, with reference to the accompanying drawings, given merely by way of example, and in which.

Figure 3:
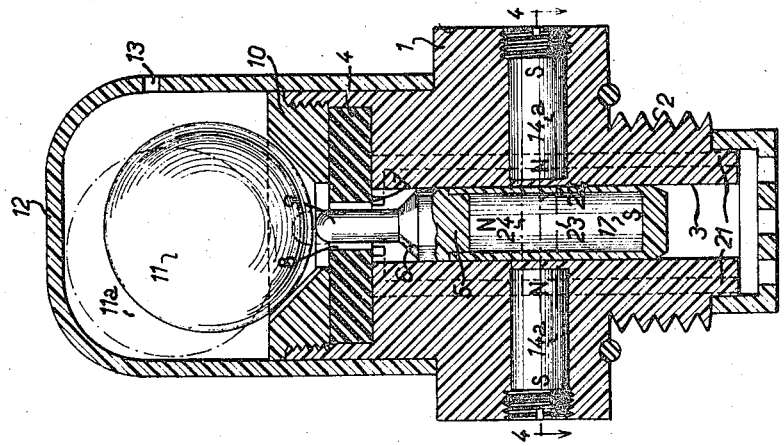
Figure 3 is an axial section illustrating a closure device of the same type as that illustrated in Figures 1 and 2, but in which the quasi-elastic system according to the invention is constructed in a different manner.

Referring first to Figures 1 to 4 illustrating a closure device adapted to be screwed into the upper wall of a container for a liquid capable of giving off gas, such for instance as an electric accumulator, or a tank for petrol, nitric acid or the like:

The body 1 of the device comprises a threaded portion 2 adapted to be screwed into a tapped hole provided in the top of the container. In the body 1 is an axial bore 3 at the upper end of which is disposed a washer 4 of plastic material having a central opening 8 which is of smaller diameter than the bore 3 and in certain conditions can be closed by a movable valve 5 having a conical portion 6 adapted to seat on the rim of the opening 8.

An axial extension 9 of the valve 5 enters the opening 8 and projects above the upper face of the washer 4 when the valve is closed. To the upper end of the body 1 is secured a washer-retaining ring 10 having a cup-shaped or conical seating for a ball 11. The closure device is completed by a cover 12 in which are pierced a number of holes 13.

A closure device of this kind will normally include an elastic system biasing the valve 5 towards its seat while the weight of the ball 11 is so selected that it keeps the valve open as long as the container is not tilted from the upright position through more than a predetermined limiting angle. If the critical angle of tilt (at which spillage of the liquid contents can occur) is exceeded the ball 11 is displaced by gravity, as shown in chain-dotted lines, and no longer engages the tip of the valve extension 9. The same thing will, of course, occur if the container is subjected to vibrations, in which circumstances the ball 11 in undergoing these vibrations will allow the elastic restoring forces to close the valve every time the ball leaves the position shown in full line in Figure 1.

Figure 2:
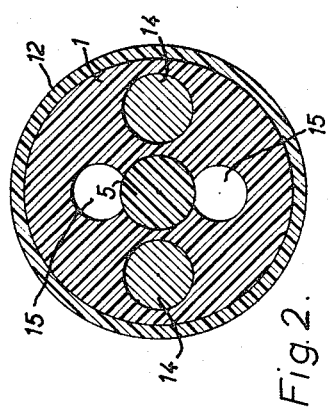
Figure 2 is a section on the line 2—2 of Figure 1.
Figure 1:
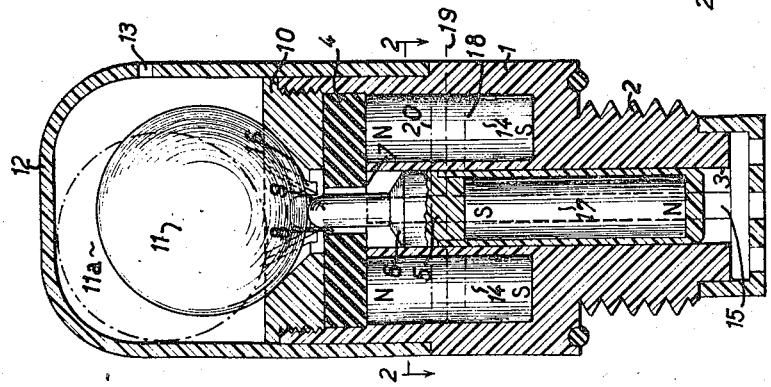
Figure 1 illustrates in axial section a closure device for accumulators, petrol tanks or the like, including a quasi-elastic device, constructed in accordance with the invention.

In the present instance quasi-elastic restoring forces acting on the valve are provided by a system of permanent magnets disposed and operating in the manner previously described. Figures 1 and 2 illustrate one constructional form of the system and Figures 3 and 4 another.

In both these constructional forms the magnets furnishing the quasi-elastic restoring force operate without contact, each of the magnets being embedded in the masses of non-magnetic material constituting the body of the device and the valve. This material may, for instance, be a plastic substance immune to attack by the contents of the container. The use of a transparent plastic substance is especially contemplated.

Referring to Figures 1 and 2, the fixed permanent magnets are disposed with their axes constituting generatrices of a cylinder coaxial with the device as a whole and with the movable valve 5. The displaceable permanent magnet is embedded in the mass of the valve 5 and is so disposed that its north-south magnetic axis coincides with the longitudinal axis of the valve 5 and of the device.

In the example illustrated two fixed permanent magnets 14 are provided, their axes being disposed in a diametral plane of the device as shown in Figure 2, which also shows two longitudinal passages 15 through which gas given off from the container can reach the opening 8 and pass through it when the valve is open, escaping thence through grooves 16 formed in the conical seating of the retaining ring 10.

In the illustration the magnets 14 are disposed with their north poles at the top and their south poles at the bottom.

The displaceable permanent magnet 17 embedded in the valve 5 is disposed with its south pole at the top and its north pole at the bottom.

The travel of the valve 5 is determined by the length of the valve extension 9.

Figure 1 shows the position occupied by the magnet 17 with respect to the magnets 14 when the valve is open. In this position the end of the magnet 17 situated in the field of the magnets 14 lies at a level 18, and when the valve is closed this end of the magnet 17 rises to a level 20, levels 18 and 20 being symmetrically disposed on either side of the median plane 19 of the fixed magnets 14.

When the upper end of the magnet 17 is in the plane 19, the north poles of the magnets 14 exert on the south pole of the magnet 17 an attraction directed upwards, while the south poles of the magnets 14 exert on the south pole of the magnet 17 a repulsion which is also directed upwards. Thus, while the south pole of the magnet 17 moves within the limits indicated, a maximum restoring force is obtained, while the south pole of magnet 17 does not leave the field of the magnets 14 and always remains between the two poles of these magnets. In this way demagnetization of magnets 14 and 17 is substantially avoided.

Figure 4:
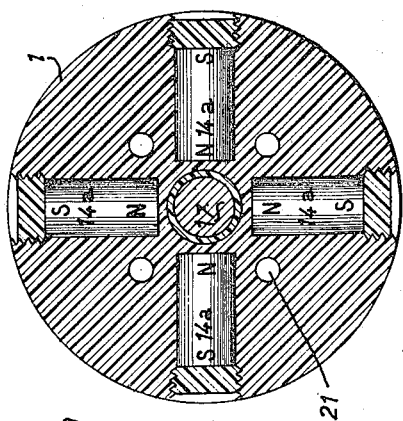
Figure 4 is a section on line 4—4 of Figure 3.

In the constructional form illustrated in Figures 3 and 4 the magnets 14a, instead of being disposed along the generatrices of a cylinder coaxial with the valve, are disposed radially in a plane normal to the axis of the valve. The example illustrated has four fixed magnets 14a spaced at 90°, as shown in Figure 4, which also shows passages 21 through which gas given off by the contents of the container reach the opening 8.

The plane 22 (see Figure 3) containing the axes of the magnets 14a lies midway between the extreme positions 23 and 24 occupied by the median plane of the displaceable magnet 17 when the valve is open and closed respectively.

In this example the north poles of the fixed magnets 14a are always disposed between the two poles of the displaceable magnet 17, whereas in the example illustrated in Figures 1 and 2 the south pole of the displaceable magnet 17 is always between the two poles of the fixed magnets.

It will be evident that in the system illustrated in Figures 3 and 4, when the magnet 17 is so placed that its median plane occupies level 23, its north pole is repelled upwardly while its south pole is attracted upwardly. In this case also the attractive and repulsive forces exerted by the movable magnets are additive and a maximum restoring force is again obtained while the fixed magnets never leave the field of the displaceable magnet and consequently demagnetization of the magnets of the system is minimized.

It will be seen that in the above described examples all the magnets are protected against attack by the gases whose flow is controlled by the closure device, because they are embedded in the plastic masses of the body of the device and of the movable valve respectively, while the magnetic action is exerted through the non-magnetic walls of the fixed and movable elements. This arrangement gives rise to one of the major advantages of a device according to the invention as compared with systems embodying springs, since the latter must necessarily act directly and consequently be exposed to the harmful action of the gases whose flow is controlled by the closure device.

Figure 6:
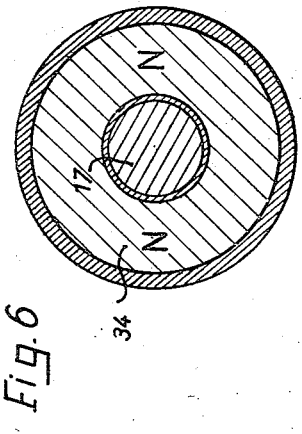
Figure 6 is a section on the line 6—6 of Figure 5.
Figure 5:
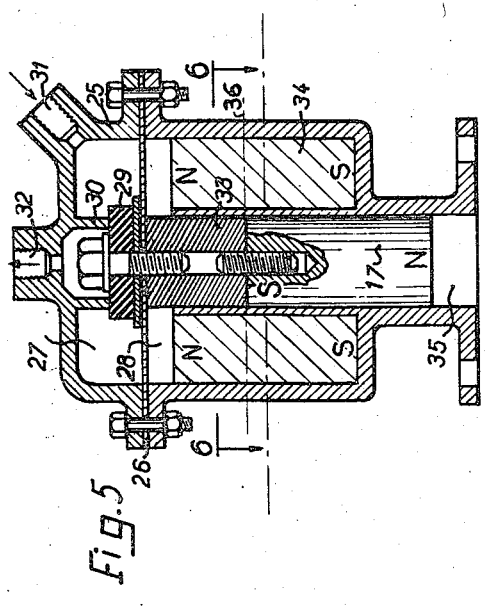
Figure 5 is an axial section of a safety valve embodying a quasi-elastic device in accordance with the invention.

Figures 5 and 6 illustrate another example of the diverse possible applications of the invention. This example further illustrates the possibility of replacing a number of fixed magnets disposed symmetrically around and parallel with the displaceable magnet by a single annular permanent magnet.

In this example the device is applied to a safety valve.

In Figures 5 and 6 the body of the valve, indicated by 25, is constituted by two elements having mating flanges by which they are fastened together and between which is secured the margin of a diaphragm 26 separating the interior of the body 25 into two compartments 27 and 28. The diaphragm carries a movable assembly comprising a washer 29 of plastic material adapted to seat on a seating 30. When the valve formed by the elements 29, 30 is open, the fluid whose pressure is to be controlled enters the chamber 27 through an opening 31 and escapes through an opening 32. The movable assembly carried by the central part of the diaphragm 26 further comprises a cylindrical extension 33 of non-magnetic material, to which is secured a cylindrical permanent magnet 17, the assembly 17, 33 being arranged to slide in a tubular guide 35 formed integrally with the lower part of the body 25 and, together with the outer wall of the body, defining an annular recess in which is received an annular permanent magnet 34 coaxial with magnet 17 and corresponding to the magnets 14 of Figure 1.

The level occupied by the upper end of the magnet 17 when the valve is closed is indicated by 36. When the fluid pressure in chamber 27 exceeds the predetermined limiting value at which the safety valve is designed to open, the diaphragm 26 distorts and the movable assembly 29, 33, 17 descends against the restoring effort of the magnetic system, thus opening the valve.

The fixed magnet 34 has the north pole at the top and the displaceable magnet 17 has the north pole at the bottom, and it will readily be seen that when the south pole of the magnet 17 is displaced downwardly it experiences an upward force due both to the repulsion exerted by the south pole of the magnet 34 and to the attraction exerted by the north pole of that magnet, the south pole of magnet 17 always remaining between the two poles of the magnet 34 as in the embodiments previously described.

Figure 7:
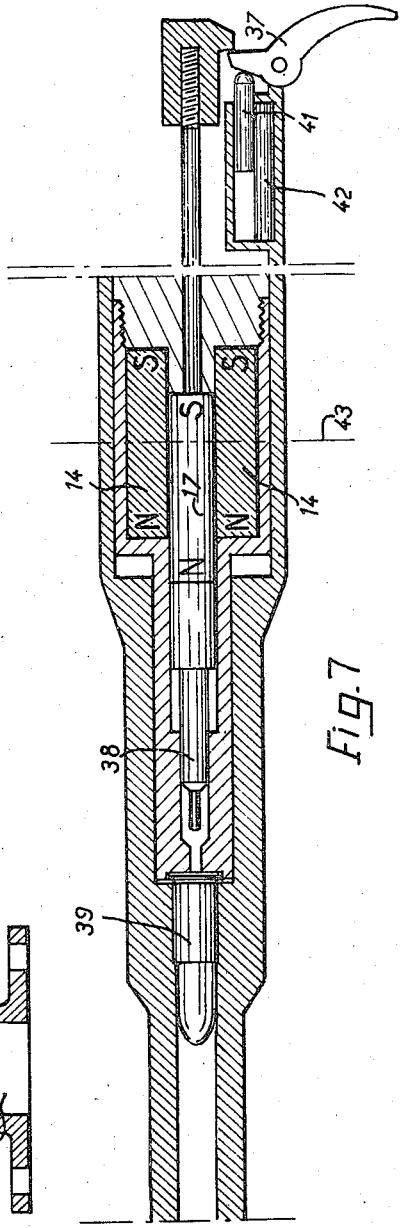
Figure 7 is a schematic axial section of a firearm incorporating quasi-elastic devices according to the invention for actuating the striker and operative on the trigger to determine the "pull"

Figure 7 illustrates the application of the invention to percussion devices, such, for instance, as those of firearms, mines or the like. In a system of this kind, when the trigger 37 is operated the striker 38 is freed and is subjected to a powerful force driving it forward.

The example illustrated in Figure 7 is a firearm, of which the striker 38 carries a striker pin adapted to strike the percussion cap of a cartridge 39 when moved from right to left as viewed in the figure. The actuating system comprises a number of permanent magnets 14 or an equivalent annular permanent magnet of the kind illustrated in Figures 5 and 6, while the striker 38 embodies a coaxial displaceable magnet 17.

In this instance the magnet 17 is disposed with its polarity in the same sense as that of magnets 14 instead of having its polarity reversed with respect to that of magnets 14. Consequently the magnetic effort exerted on magnet 17 tends to drive it out of the tunnel defined by the magnets 14 instead of tending to draw it into the tunnel as is the case in the arrangements of Figures 1, 2 and 5, 6.

When the south pole of the magnet 17 of Figure 7 is in the position indicated, i. e. to the right of the median plane 43 of the fixed magnets 14, it experiences a repulsion from the south poles of magnets 14 and an attraction from the north poles of magnets 14, both tending to drive the magnet 17 to the left, while the repulsion between the north poles of magnets 14 and 17 exerts an additional effort tending to drive the magnet 17 to the left (as viewed in the figure).

Figure 7 further illustrates another application of the invention, in this case to the trigger mechanism of the firearm or the like (see right and part of Figure 7).

In this application the conventional trigger spring is replaced by a pair of bar magnets 41, 42 of which magnet 42 is fixed and magnet 41 is free. These magnets are disposed with their axes parallel and so that one pole of magnet 41 always lies between the poles of magnet 42, the other pole of magnet 41 being in contact with the trigger 37. The polarities are so disposed that the magnetic field of magnet 42 exerts on magnet 41 an effort tending to move it to the right, as viewed in the figure. This effort, constituting the so-called "pull" of the trigger, must be overcome in pulling the trigger 37 to release the striker 38 for actuation by the main magnetic system 14, 17.

It is to be understood that Figure 7 is schematic only. In practice the engagement of the trigger 37 with the striker 38 will not be as shown in the figure, but will be such that the effort exerted by the main magnets 14, 17 on the striker will not be transmitted to the trigger or to the auxiliary magnet system 41, 42. Usually, intermediate elements will be interposed between the striker and the trigger.

According to the arrangements illustrated in Figs. 1 to 7, the permanent magnet 17 unitary with the member of a mechanism displaceable in a limited determinate path is disposed between fixed permanent magnets, but it will be understood that the reverse arrangement may be employed whereby the centrally disposed magnet is fixed and so positioned with respect to at least one movable permanent magnet carrying the member of a mechanism which shall be displaceable in a limited determinated path, that one pole of said movable permanent magnet is always situated between the two poles of said fixed permanent magnet.

Figure 8:
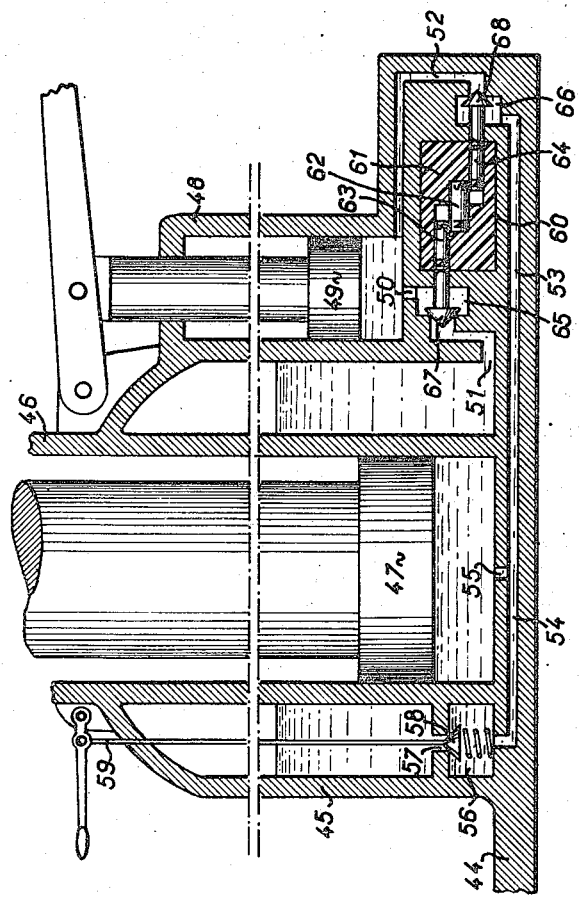
Figure 8 is an axial sectional view showing a conventional hydraulic lifting jack, the check valve construction of which embodies a magnetic device according to the invention.

Fig. 8 shows a conventional hydraulic lifting jack the check valve mechanism of which has been selected for illustrating the just above described modified form of the invention, it being understood that specific details of the lifting jack constitute no part of the present invention.

As shown, the hydraulic lifting jack includes a base member 44 supporting an outer casing 45 which constitutes an oil reservoir, a jack cylinder 46 disposed axially of the casing 45 and having a piston 47 adapted to reciprocate therein, and a manually operable pump comprising a pump cylinder 48 and a piston 49, said pump being arranged to receive oil from the reservoir 45 through the medium of a suction or intake duct 50—51 and to discharge oil under pressure into the jack cylinder 46 through the medium of an exhaust duct 52—53 and a bore 55 provided in the bottom of the cylinder 46, said cylinder communicating through the same bore 55, a duct 54 leading to a drain chamber 56, and an outlet port 57 of said drain chamber, with the oil reservoir 45. The outlet port 57 of the drain chamber is normally closed by a spring-loaded valve 58. For setting in communication the passage 54 and outlet port 57, and consequently the interior of the jack cylinder 46 and the oil reservoir, there is provided a manually actuated valve operating rod 59 arranged so that it suffices to push said rod downwardly in order to remove the valve 58 from its seat. When the draining is completed, the pressure on the rod 59 is released and said communication is then automatically interrupted under the action of the spring.

The above described parts will be recognised as conventional. Any suitable or preferred form of draining or pumping mechanism per se may be used and for the present purposes, it will suffice to say that the intake as well as the exhaust side of the pump cooperates with check valve mechanisms adapted to permit flow of fluid therethrough in one direction but preventing flow of fluid in the opposite direction. Such check valve mechanisms usually comprise a movable valve member applied against its seat by a suitable spring as this is well known in the art.

The magnetic device according to the invention may also constitute a valuable improvement upon check valves of this general nature and a simple embodiment thereof may be described as follows:

The portion of the base member 44 of the hydraulic jack which supports the pump casing is formed with a chamber 60 in which is lodged a block 61 made of any suitable non-magnetic material. In the centre of block 61, there is embedded a fixed permanent bar magnet 62, and two permanent bar magnets 63 and 64 are slidably mounted in respective bores drilled in block 61 at opposite sides thereof in such a manner that said bores extend parallel and in a spaced side-by-side relationship to the fixed magnet 62 up to substantially the median plane thereof. Two corresponding opposite walls of chamber 60 are provided with a bore registering each with a magnet containing bore of block 61 so that each movable magnet may be brought in abutting contact with a rod inserted in said bores of chamber 60 and projecting outside the same into respective valve chambers 65 and 66, the valve chamber 65 intersecting the intake duct 50—51, and the valve chamber 66 intersecting the exhaust duct 52—53 of the pump 48—49. A valve member 67 carried by the outward projecting end of the rod associated with the movable magnet 63 is adapted to cooperate with a valve seat encircling the inlet port of valve chamber 65, whereas a valve member 68 carried by the outward projecting end of the rod associated with the movable magnet 64 is adapted to cooperate with a valve seat encircling the inlet port of valve chamber 66.

As in the forms of the invention disclosed in Figs. 1 to 7, the permanent magnets 62, 63, 64 are so disposed and orientated that one of the poles of the movable magnets 63 and 64 cannot leave the magnetic field of the fixed magnet 62. Thus, when pump piston 49 is actuated to draw oil from reservoir 45 through duct 51, valve chamber 65, and bore 50, the suction generated by the upwardly moving pump piston will unseat the movable intake check valve member 67 against not only the attractive force of the adjacent poles of opposite polarity of the movable magnet 63 and the fixed magnet 62 but also against the repulsive force of the poles of same polarity of said two magnets. On the other hand, said combined attractive and repulsive forces will close the intake valve and maintain the same firmly upon its seat as soon as the suction stroke of the pump piston is stopped.

The exhaust valve operates in the same manner as has been just described with reference to the intake valve, that is, the movable valve member 68 is disposed to open against magnetic force under the influence of liquid flow discharged from the pump cylinder 48, but to seat under the action of said magnetic force as soon as the discharge ceases so as to prevent the return flow of liquid into the pump cylinder.

It will be appreciated that in the above described double check valve mechanism the single fixed magnet 62 replaces advantageously the two spring members usually provided in conventional combined intake and exhaust valve mechanisms.

Obviously, the invention is not limited to the several above described embodiments, which are susceptible of numerous modifications. Thus, in the different examples, it is possible to modify the manner of combining, the one with the other, the permanent magnets of the stationary and displaceable magnetic systems. Any number of fixed and displaceable permanent magnets may be used having any length, cross-section or shape, and the said magnets may be grouped and disposed in any appropriate manner provided that the magnetic axes of the fixed and displaceable magnets never coincide pole to pole, that the repulsive and attractive efforts exerted by the fixed magnetic field on the displaceable magnet or magnets are additive and produce a maximum restoring force, and that the poles of one of the magnetic systems do not pass outside of the field of the other magnetic system.

What I claim is:

1. A quasi-elastic device for exerting on a member of a mechanism, which member is displaceable in two opposite directions in a limited determinate path, an effort tending to displace said member in one of said directions towards one limit of said path, said device comprising a supporting member provided with a bore, a permanent magnet bar in said bore adapted to be axially movable with said displaceable member, and a fixed permanent magnet bar mounted in said support so as to have one of its ends adjacent to and between the ends of said movable magnet bar for all positions thereof, said end of the fixed magnet bar having a polarity tending to attract one of the poles and to repulse the other pole of said movable magnet bar in the direction of said effort.

2. A magnetic device for constantly urging the reciprocable member from an inoperative position to an operative position, comprising a support provided with a bore, a permanent magnet bar slidably mounted in said bore and associated with said reciprocable member so as to be axially movable therewith between said inoperative and operative positions, a fixed permanent magnet bar mounted in said support so as to move one end positioned adjacent to and between the ends of said movable magnet bar for all positions thereof, said one end of the fixed magnet bar having such polarity that the attractive force which it exerts on the pole of opposite polarity of said movable magnet bar as well as the repulsive force which it exerts on the other pole thereof, urge said movable magnet bar and said reciprocable member, constantly towards said operative position, and displaceable means adapted to maintain said reciprocable member in said inoperative position against the constant action of said attractive and repulsive forces.

3. A quasi-elastic device according to claim 1, wherein the magnetic axes of the fixed and movable bars are parallel.

4. A quasi-elastic device according to claim 1, wherein a plurality of fixed magnet bars are symmetrically disposed about the movable magnet bar.

5. A quasi-elastic device according to claim 1, wherein a number of fixed magnet bars are symmetrically disposed radially with respect to the movable magnet bar.

6. A closure device having a vent valve member displaceable between closed and open position and gravity actuated means for maintaining said valve member in open position against the effort of biasing means adapted to urge said valve member towards closed position, said biasing means comprising a permanent magnet incorporated in said valve member to move therewith between said closed and open positions, and a fixed permanent magnet mounted in said closure device so as to have one end positioned adjacent to and between the ends of said movable magnet for all positions thereof, said one end of the fixed magnet having such polarity that the attractive force which it exerts on the pole of opposite polarity of the movable magnet as well as the repulsive force which it exerts on the other pole thereof, urge said movable magnet and consequently said valve members towards said closed position so as to close said vent valve when said gravity actuated means are inoperative.

References Cited in the file of this patent

UNITED STATES PATENTS

| | | |
|---|---|---|
| 1,784,517 | Farrand | Dec. 9, 1930 |
| 2,110,153 | Halst | Mar. 8, 1938 |
| 2,113,454 | Mitchell | Apr. 5, 1938 |
| 2,232,279 | Snyder | Feb. 18, 1941 |
| 2,261,349 | Edelman | Nov. 4, 1941 |
| 2,292,648 | Moore | Aug. 11, 1942 |
| 2,472,090 | Brewer | June 7, 1949 |
| 2,578,419 | Gittings | Dec. 11, 1951 |
| 2,585,714 | Wrobel | Feb. 12, 1952 |
| 2,667,895 | Pool | Feb. 2, 1954 |

FOREIGN PATENTS

| | | |
|---|---|---|
| 544,427 | France | June 22, 1922 |

UNITED STATES PATENT OFFICE

CERTIFICATE OF CORRECTION

Patent No. 2,869,563　　　　　　　　　　　　　　　January 20, 1959

Emile Robert Schoengrun

It is hereby certified that error appears in the printed specification of the above numbered patent requiring correction and that the said Letters Patent should read as corrected below.

Column 7, line 54, for "to move one" read -- to have one --.

Signed and sealed this 21st day of April 1959.

(SEAL)
Attest:

KARL H. AXLINE
Attesting Officer

ROBERT C. WATSON
Commissioner of Patents